United States Patent [19]
Tamburino et al.

[11] 3,913,943
[45] Oct. 21, 1975

[54] ROCK EJECTING AND SUSPENSION LIMITING ARRANGEMENT FOR DUAL WHEELED VEHICLES

[75] Inventors: James C. Tamburino, Roselle; Lawrence A. Venere, Wood Dale, both of Ill.

[73] Assignee: International Harvester Company, Chicago, Ill.

[22] Filed: Aug. 19, 1974

[21] Appl. No.: 498,360

[52] U.S. Cl. .................. 280/158 A; 301/36 WP
[51] Int. Cl.² ............................................ B60S 1/68
[58] Field of Search....... 305/11; 280/158 R, 158 A, 280/124 R, 124 F; 301/36 WP, 9 DN

[56] References Cited
UNITED STATES PATENTS

| | | | |
|---|---|---|---|
| 851,055 | 4/1907 | Beskow | 280/158 A |
| 2,823,928 | 2/1958 | Dahlstrom | 280/158 A |
| 3,771,812 | 11/1973 | Pierce | 280/124 F |
| 3,788,668 | 1/1974 | Perger | 280/158 A |

FOREIGN PATENTS OR APPLICATIONS

| | | | |
|---|---|---|---|
| 843,125 | 9/1938 | France | 301/36 |

*Primary Examiner*—Leo Friaglia
*Assistant Examiner*—John A. Carroll
*Attorney, Agent, or Firm*—William H. Wendell; Floyd B. Harman

[57] ABSTRACT

A rock ejecting and suspension limiting arrangement for dualed wheeled vehicles in which foreign matter is ejected from between the dual wheels and the vertical extension of the vehicle suspension is limited.

3 Claims, 8 Drawing Figures

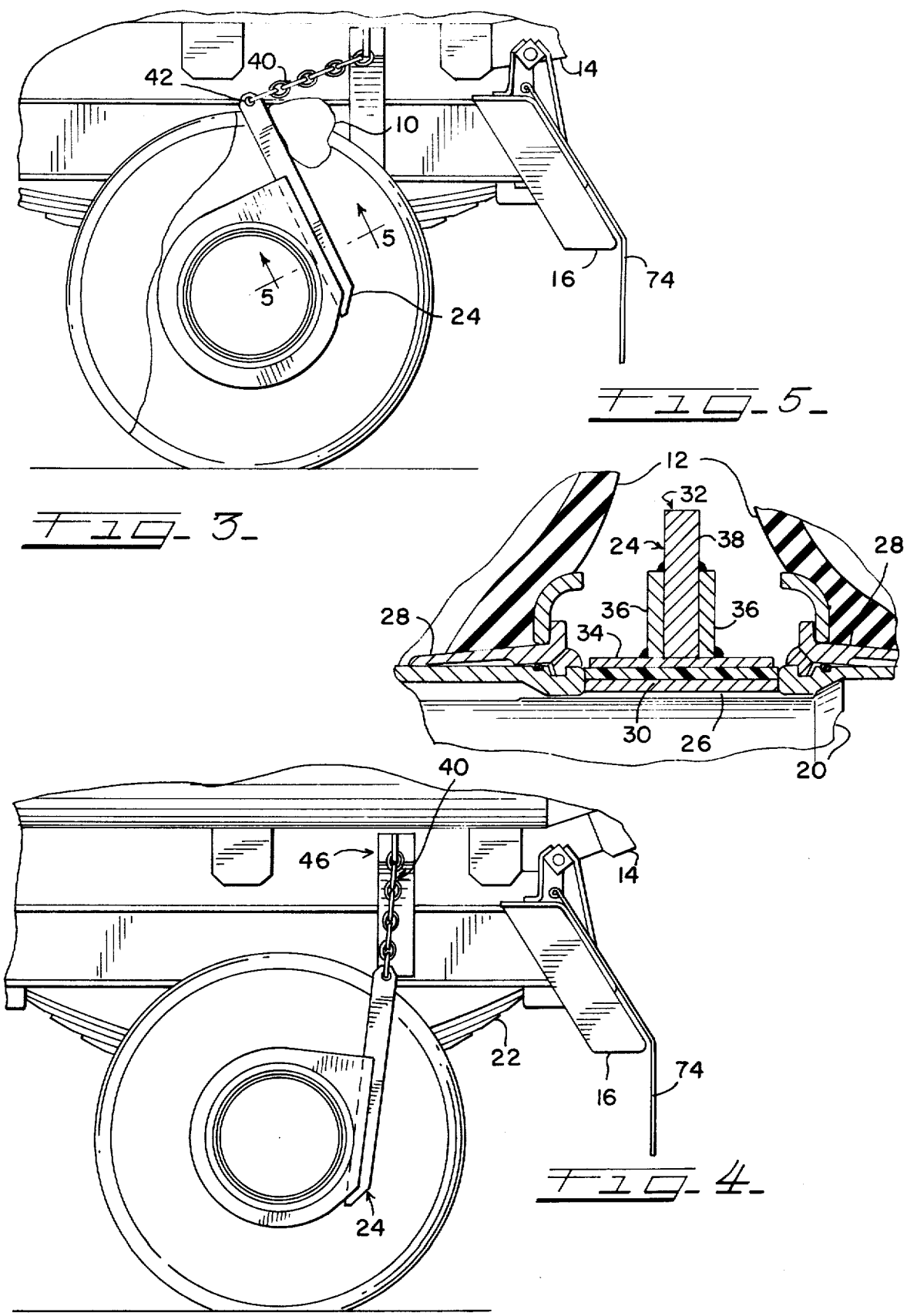

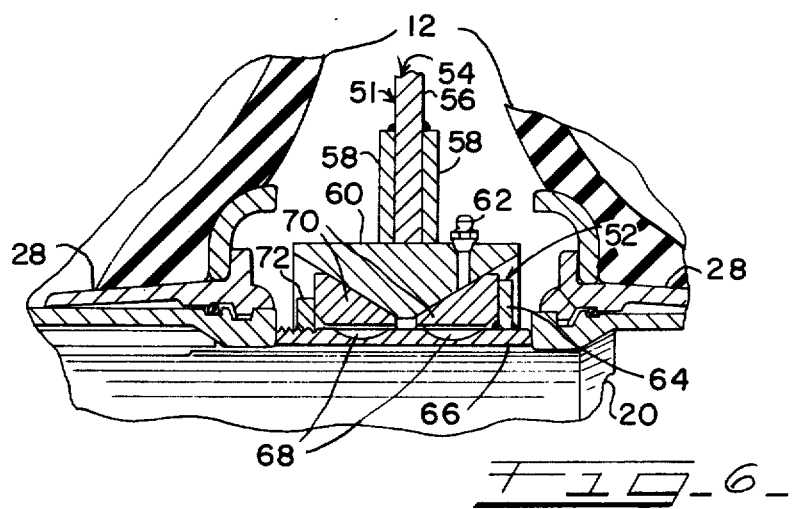
FIG_6_
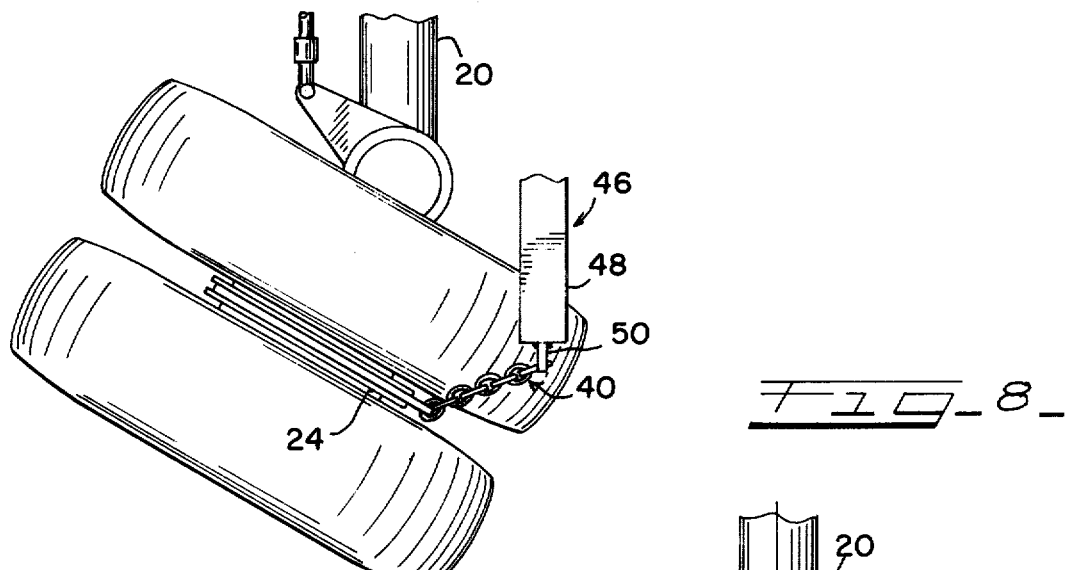
FIG_7_
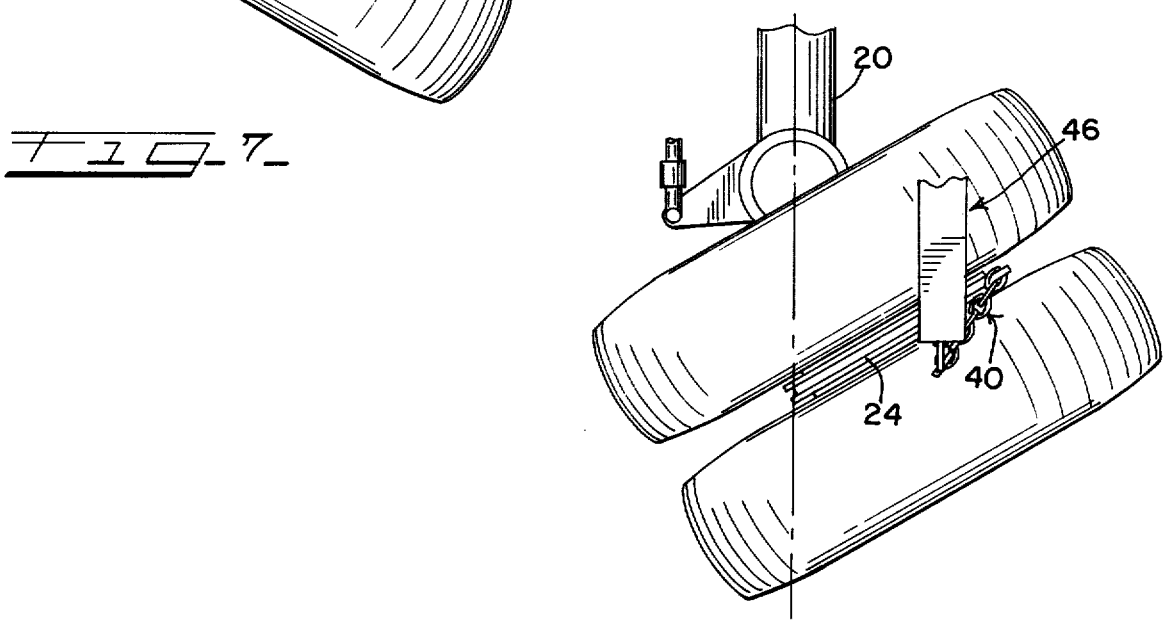
FIG_8_

3,913,943

ROCK EJECTING AND SUSPENSION LIMITING ARRANGEMENT FOR DUAL WHEELED VEHICLES

BACKGROUND OF THE INVENTION

This invention relates generally to rock ejectors for dual wheeled vehicles and more particularly concerns ejectors which also act as suspension limiters while being adaptable to steerable and non-steerable dual wheels.

During the operation of these dual wheeled vehicles, rocks and other foreign matter may become lodged between the dual wheels and rotated with the wheels about their axes of revolution. Such rotation can be injurious both to the tires, by producing an unbalanced rotation that causes excessive wear, and to following vehicles, which could be struck by the material when centrifugal force propels it away from the wheels. The existing structures which provide a safe method for ejecting the foreign matter all utilize a rigid lever suspended, either from the vehicle frame or the vehicle body, between the wheels. The foreign matter will drive these levers against the spacer separating the wheels with the resulting impact and rotational movement blockage ejecting the matter.

In the existing structures allowance is made for the extreme oscillation of the vehicle that can occur during operations on rough terrain. This oscillation must be a design criterion since a lever suspended from the frame and capable of pivoting only in a single vertical plane would become wedged against the tires and damage them when wheel suspension is deflected. The current structures accomplish this multi-planar movement either by the use of a double articulated link pivotally connected to the lever and the frame or by the use of a spring suspension of the lever.

The same oscillation which produced this design criterion also produces a design problem in the suspension of the vehicles. Normal suspension systems are designed with the idea of absorbing loads which act to decrease the vertical distance between the wheels and the frame. However, the oscillation caused by rough terrain introduces the requirement of absorbing forces which act to increase the vertical distance between the wheels and the frame. The existing rock ejecting structures do not incorporate a method for limiting the suspension extending forces. These structures also do not incorporate the multi-planar motion necessary to permit the application of the structure to steerable wheels. Accordingly, it is the primary aim of the present invention to overcome the problems of the prior structures while providing a functional and practical means for ejecting foreign matter and limiting the suspension on dual wheels.

With more particularily, it is an object of the present invention to provide a rock ejecting and suspension limiting arrangement which is relatively inexpensive and relatively resistant to the abrasive character of its environment while being adaptable to both steerable and non-steerable dual wheels.

Finally, another object of the present invention is to provide an arrangement of the class described which is easy to install, is easy to maintain, and dependable in its operation.

SUMMARY OF THE INVENTION

In accordance with the invention, the arrangement will function on a dual wheeled vehicle having a frame, axles resiliently attached to the frame, a plurality of pairs of dual wheels operably mounted on the axles with wheel spacers establishing the lateral spacing of the wheels in each pair. The arrangement includes a rock ejecting element rotatably mounted on the wheel spacer and a restraining element that limits the motion of the rock ejecting element, thereby making the rock ejector eject foreign matter that becomes wedged between the spaced wheels and the combined elements act as a limiter of the suspension by limiting the vertical extension of the axle with respect to the vehicle frame.

BRIEF DESCRIPTION OF THE DRAWINGS

Other objects and advantages of the invention will become apparent on reading the following detailed description and upon reference to the drawings, in which:

FIG. 3 is a side view similar to FIG. 1 with foreign matter shown immediately before ejection;

FIG. 4 is a side view also similar to FIG. 1 except that the suspension is shown in its fully extended position;

FIG. 5 is a section view, along line 5—5 of FIG. 3, depicting the axial relationship between the rock ejecting means and the dual wheels;

FIG. 6 is similar to FIG. 5 except it shows an alternative embodiment of the disclosed structure;

FIG. 7 is a plan view of steerable dual wheels and the arrangement of the invention with the wheels in a full right turn position; and FIG. 8 is similar to FIG. 6 with the dual wheels in a full left turn position.

Figure 1:
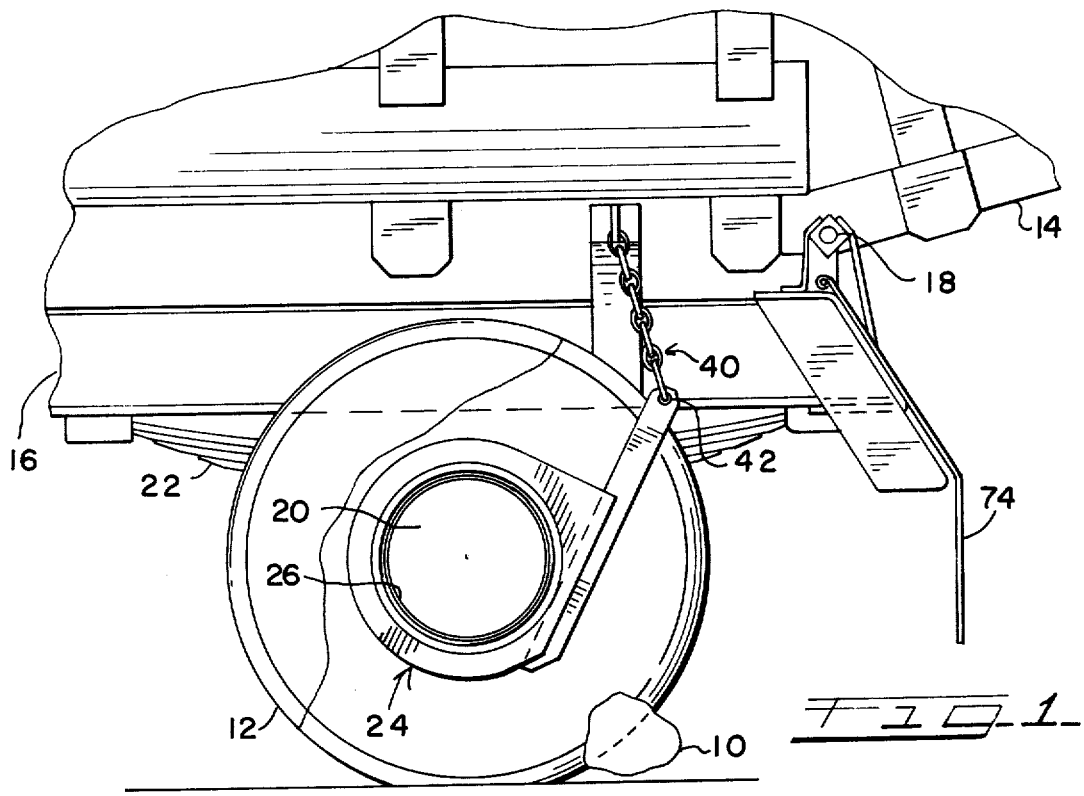
FIG. 1 is a side view of the non-steerable dual wheels of a dual wheel vehicle incorporating the arrangement of the invention.

While the invention will be described in connection with the preferred embodiments, it will be understood that it is not intended to limit the invention to these embodiments. On the contrary, it is intended to cover all alternatives, modifications, and equivalents that may be included within the spirit and scope of the invention as defined by the appended claims.

DETAILED DESCRIPTION OF THE INVENTION

When dual wheeled vehicles are being operated there is always the possibility that a rock or some other foreign matter will become wedged between the tires of the paired wheels. In the illustrated embodiment a rock 10 is shown wedged between the tires 12 in FIGS. 1 and 2. The dual wheeled vehicle in the preferred embodiment has a dump body 14 pivotally attached to the rear section of the vehicle frame 16 by pins 18. The axles 20 of the illustrated vehicle are suspended from frame 16 by a conventional leaf spring suspension 22.

In the preferred embodiment of the invention the rock ejecting means 24 or 51 is rotatably mounted on the conventional wheel spacer 26 or 66, as shown in FIGS. 5 and 6, respectively. As shown in FIG. 5, the wheel spacer 26 separates the tires 12 by separating the wheels 28 upon which the tires 12 are mounted. The rock ejecting means 24 is a combination of a bushing means 30 which is rigidly affixed to a lever means 32 by bonding, rivetting or some other conventional affixing means. The bushing means 30 is a material, e.g. bronze, which minimizes the sliding friction between the lever means 32 and the wheel spacer 26 while surviving in the dusty, wet, hot and cold environment in which it must perform. The lever means 32 of the preferred embodiment is a welded combination of a hub 34, side plates 26, and a bar 38.

In the alternative embodiment shown in FIG. 6, the rock ejecting means 51 is a combination of a centered bearing means 52 and an arm means 54. In this configuration the arms means 54 comprises an arm 56 rigidly attached by welding to two side sheets 58 which are welded to an angled hub 60 with lubrication means 62. The centered bearing means 52 includes a stop plate 64 welded to a modified wheel spacer 66, keys 68, annular angled bearing material 70 and a lock nut 72. The modified wheel spacer 66 retains keys 68 which eliminate the rotational movement between the annular angled bearing material 70 and the modified wheel spacer 66. The modified wheel spacer accepts the lock nut 72 which controls the axial location of the arm means 54 by holding the annular angled bearing material 70 in contact with the angled hub 60 and the stop plate 64. This configuration also accommodates adjusting the axial position of the angled bearing material 70 to allow for wear, thereby maintaining the integrity of the centered bearing means 52.

The lever means 32 in both embodiments is constructed to have one end of the bar 38 or arm 56 extending outside the radius of the tires 12. In the particular device illustrated, a chain 39 is the restraining means 40 which is attached to the lever means 32 or arm means 54 by passing through hole 42 which is in the extended end of the bar or arm, see FIGS. 1 and 2. The restraining means 40 is also attached to the frame 16 by passing through hole 44 in the support means 46 which is rigidly attached to frame 16 by welding. Hole 44 in the support range 46 is located above the tire 12 and in close proximity to a vertical plane which would be equidistant between the tires 12 of the dual wheeled assembly when the vehicle is on a straight path. The location of the holes 42 and 44 eliminate the possibility of the restraining means 40 contacting the tires 12.

The combination of the equidistant position of the hole 44 and the protruding position of hole 42 with the flexible characteristic of the restraining means 40 facilitates the application of the arrangement of the invention to a steerable dual wheel assembly (shown in FIGS. 7 and 8). When the vehicle is turning the rock ejecting means 24 rotates counterclockwise about the wheel spacer 26 in reaction to the lifting force of the restraining means 40 which is caused by the change in the arrangement's geometric configuration. This rotation avoids the generation of any appreciable force opposing the turning of the vehicle, and when combined with the locations of holes 42 and 44 provides a structure which does not oppose the turning of the vehicle or contact the tires during the turning of the vehicle.

While in the preferred embodiment the restraining means 40 is a chain 39 and the support means 46 is a welded assembly of a connecting plate 48 and base plate 50. One skilled in the art will appreciate that the invention is not necessarily so limited. The principle objects of the invention could be accomplished by a cable or other element with flexibility in all but one direction in which direction it has high strength in tension, and any structural member of comparable strength which extends the frame to a similar position over the dual wheels. This replacement would require some modification of other elements of the invention but they could be accomplished without affecting the function of the invention.

Figure 2:
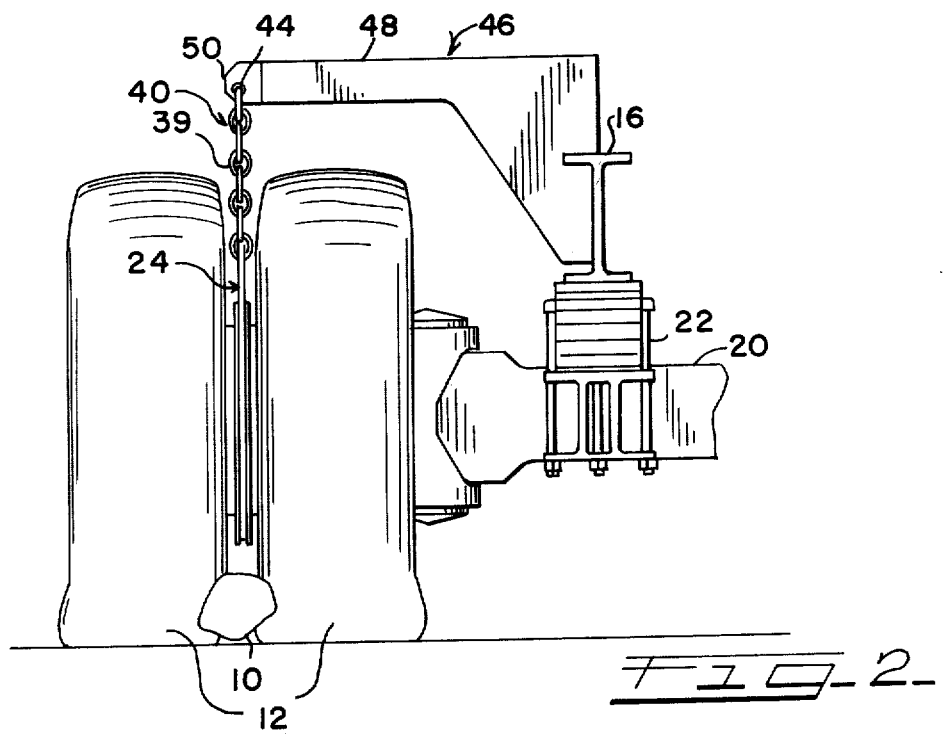
FIG. 2 is a rear view of the steerable dual wheel, the frame, the axle and the suspension of a dual wheel vehicle incorporating the arrangement of the invention.

From the foregoing it will be seen that when a rock 10 becomes wedged between the tires 12 of a dual wheel assembly while the vehicle is moving in a forward direction (counterclockwise tire rotation), the lever means 32 will be forced to rotate from its free position of FIG. 1 to its ejecting position of FIG. 3. In the ejecting position the restraining means 40 stops the rotation of the rock ejecting means 24 and the continued rotation of the tire will dislodge the rock 10 from between the tires. After ejection from its wedge position, the rock 10 will be propelled rearward at a safe speed and be deflected to the ground by the vehicle frame 16, the dump body 14 or the fender 74. Although the ejection of material is not shown for a rearward motion of the vehicle (clockwise tire rotation) it will be obvious to those skilled in the art that the preferred embodiment will eject wedged material during both forward and rearward vehicle movements.

In addition to the rock ejecting function the arrangement of the invention also acts as a suspension limiter during high vehicle oscillations. During such oscillation the distance between the axle 20 and the frame 16 increases which changes the geometric configuration of the arrangement and makes the restraining means 40 rotate the rock ejecting means 24 from its free position counterclockwise about the axle 20. The rotation is stopped and the suspension is limited when the separation distance between the axle 20 and the frame 16 make the rock ejecting means 24 and the restraining means 20 act as a rigid connection between the axle 20 and frame 16.

Thus it is apparent that there has been provided, in accordance with the invention, a rock ejecting and suspension limiting arrangement for dual wheeled vehicles that is relatively inexpensive and relatively resistant to the abrasive character of its environment, that is functional on both non-steerable and steerable dual wheels during maximum oscillation operations and that is easy to install, easy to maintain and dependable in its operation. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. A rock ejecting and suspension limiting arrangement for a dual wheeled vehicle with a frame, axles resiliently attached to said frame, a plurality of pairs of steerable and non-steerable dual wheel assemblies operably mounted on said axles with wheel spacers laterally separating said wheels in each pair, said arrangement comprising, in combination:

rock ejecting means rotatably mounted on and axially centered on said wheel spacer, having a connecting aperture outside the outer diameter of said wheel assembly and capable of limited pivotal motion about said axle for ejecting material trapped between said wheels of each said pair of wheels and limiting the vertical motion of said axle with respect to said frame whereby the vertical deflection of said resilient mounting of said axles is limited;

a support rigidly attached to said frame; and restraining means operably attached to said support and said rock ejecting means for limiting said pivotal motion of said rock ejecting means about said axle and said vertical motion of said axle with respect to said frame.

2. The combination of claim 1 further defined by said rock ejecting means comprising:

lever means rotatably mounted on said wheel spacer having a connecting aperture outside the outer diameter of said wheel assembly and capable of limited pivotal motion about said axle for ejecting material trapped between said wheels of each pair of wheels and capable of limited vertical motion with respect to said vehicle frame for limiting the vertical deflection of said resilient axle mounting; and bushing means in operative relation to said lever means for controlling the friction of said rotational motion and the axial location of said lever means.

3. The combination of claim 1 further defined by said rock ejecting means comprising:

arm means rotatably mounted on said wheel spacer, having a connecting aperture outside the outer diameter of said wheel assembly and capable of limited pivotal motion about said axle for ejecting material trapped between said wheels of each pair of wheels, and capable of limited vertical motion with respect to said vehicle frame for limiting the vertical deflection of said resilient axle mounting;

centered bearing means in operative relation to said lever means for controlling the friction of said rotational motion and the axial location of said lever means.

* * * * *